Patented Jan. 17, 1933

1,894,792

UNITED STATES PATENT OFFICE

LEO SCHLECHT AND HANS ROETGER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MANUFACTURE OF VALUABLE PRODUCTS FROM GASEOUS UNSATURATED HYDROCARBONS

No Drawing. Application filed October 3, 1929, Serial No. 397,151, and in Germany October 18, 1928.

The present invention relates to improvements in the manufacture of valuable products from gaseous unsaturated hydrocarbons.

We have found that valuable hydrogenated condensation products can be obtained from unsaturated hydrocarbons in the gaseous state or mixtures containing the same, in particular from acetylene, in a simple manner and with good yields, by catalytically condensing the said initial materials with a compound containing an active hydrogen atom of a metalloid having an atomic weight from 14 to 16 i. e. with ammonia and/or amines, water vapor or mixtures thereof and hydrogenating the still reactive products i. e. during their formation or directly after their production, without separating them from the hot reaction mixture. Instead of the said mixtures of hydrocarbons and water vapour the corresponding aldehydes may also be subjected to a condensing and hydrogenating treatment, the aldehydes being formed by the addition of water to the unsaturated hydrocarbons and being therefore considered as equivalents for the said mixtures of hydrocarbons and water vapour in the process according to the present invention. All the before-mentioned processes can be applied not only to the hydrocarbons or aldehydes singly, but also to mixtures of the same. According to this manner of working the operations of working are simplified. Moreover, the products obtained in this manner, are of a much more uniform nature than those obtained when working according to two entirely separate processes of condensation and hydrogenation. By working in the before-described manner with acetylene and ammonia, monoethylamine can be obtained in a very good yield, whereas the separate hydrogenation of acetonitrile, prepared by the reaction of ammonia and acetylene, furnishes a mixture of primary, secondary and tertiary amines. The condensation on the one hand and the hydrogenation on the other hand may be carried out, in cases in which the two reactions proceed at comparatively moderate temperatures and within the same interval of temperature, by mixing together the catalysts which are necessary for the two reactions and allowing them to come into contact with the hydrogenous reaction mixture. If, however, the temperature of the formation of the condensation products is so high, in particular when working in the gas phase, that at the same temperature an appreciable splitting of the unsaturated hydrocarbons by the hydrogenating catalyst may occur, sometimes even with the separation of carbon, the condensation catalyst and the hydrogenation catalyst are arranged one directly behind the other either in the same or in separate but adjacent reaction chambers and the working conditions are so chosen that the greater part of the unsaturated hydrocarbons is condensed before the hydrogenation. This latter arrangement is also chosen for reactions in which the hydrogenation is carried out at a different temperature.

The hydrogen necessary for the hydrogenation, in so far as it is not already present in the reacting gas mixture can be incorporated with the reaction mixture either before the condensation or immediately before the hydrogenation. On the other hand industrial gas mixtures containing hydrogen as well as unsaturated hydrocarbons are often available such as can be obtained for example by passing coke oven gases or a mixture of methane and hydrogen through a high tension electric arc.

This process is particularly suitable for the manufacture of hydrogenated condensation products such as amines, piperidines and hydrogenated quinolines.

It has been found for example that hydrogenated cyclic condensation products are mainly obtained, no matter whether starting with aliphatic or cyclic aldehydes by condensing aldehydes or their derivatives together with ammonia or amines at temperatures above about 250° centigrade say, up to 500° C., and simultaneously or subsequently hydrogenating them, if necessary at lower temperatures, such as between about 150° and 250° C. In this manner open chain amines are only obtained in small quantities or not at all, but on the contrary mixtures of hydrogenated heterocyclic compounds, as for example hydrogenated derivatives of pyridine, hydrogenated quinoline and the like having a uniform nature, are obtained in good yields.

Mixtures of aldehydes with unsaturated hydrocarbons, for example acetylene, and also in particular with industrial gas mixtures which contain these and which also contain large quantities of hydrogen, may be employed for this reaction.

As condensation catalysts metal compounds of the second subgroup to the 6th group of the periodic system having a more metallic character than arsenic are suitable, especially when distributed on carriers such as silica gel and the like. (The term "having a more metallic character than arsenic" means that the metals of the compounds stated are precipitated from solutions of water-soluble salts of the said metals by adding metallic arsenic to the said solutions.) Particularly suitable are the difficultly reducible compounds of the aforesaid series, but also the readily reducible compounds, namely those of the metals of the second subgroup to the fifth group, such as cadmium, may be employed and also in the form of the metals themselves, since in the presence of hydrogen their compounds are reduced to the metals. The usual hydrogenation catalysts as for example metals of the iron group, copper, metallic platinum, and the like may be employed as hydrogenation catalysts, preferably in a finely divided state. If, however, unsaturated heterocyclic compounds are to be produced, the last layer of the hydrogenating catalyst is heated to higher temperatures than the foregoing. In the hydrogenation of the heterocyclic compounds containing side-chains, such as the alkylated pyridines or quinolines, more or less of the side-chains may be then split off and substituted by hydrogen depending on the temperature of working. By raising the temperature in the layer of catalyst arranged as the last so far that the hydrogenating action of the catalyst is converted into a dehydrogenating action which event occurs with the usual hydrogenating catalysts at a temperature of from about 240° to 300° centigrade, pyridine or quinoline or other compounds free from side-chains may be obtained from unsaturated hydrocarbons, aldehydes in a good yield, whereas a direct condensation of the said components usually leads only to traces of the said bases.

In order to increase the yield of these substances the formation of nitriles must be avoided as far as possible, and therefore the condensation is preferably carried out with a high velocity of passing the gaseous mixtures over the catalyst employed i. e. at a speed of at least 10 liters of the hydrocarbon per hour and per each liter of catalytic substance employed, and preferably with the aid of catalytic substances containing metallic cadmium or lead in a finely divided state.

The following examples will further illustrate the nature of this invention, but the invention is not restricted to these examples. The parts are by weight.

Example 1

Acetylene is laden with water vapor by passage through water at 90° centigrade and is then passed over zinc oxide precipitated on silica gel at a temperature of 380° centigrade. The reaction mixture thus obtained, after mixing with hydrogen, is then passed, without special cooling, over finely divided nickel at a temperature of 200° centigrade. The condensate obtained by cooling the reaction mixture contains chiefly ethyl alcohol in addition to small quantities of acetaldehyde and acetic acid.

Example 2

A mixture of 7 parts each of acetylene and ammonia and 20 parts of hydrogen is passed, in a tube, first over a catalyst consisting of a mixture of equal parts by weight of zinc oxide and thorium oxide precipitated on silica gel at a temperature of 350° centigrade and then, without special cooling, over finely divided nickel applied to silica gel at a temperature of 150° centigrade. The velocity of the gas and the quantity of the catalysts is regulated so that before passing the nickel the gas mixture contains practically no acetylene. The condensate, which amounts to about 140 cubic centimeters for each 100 liters of acetylene employed, consists mainly of piperidine and monoethylamine. By fractional condensation the greater part of the latter may be separated from the piperidine. By the addition of steam to the said mixture of acetylene and ammonia and slightly accelerating the velocity of the reacting gases the ratio of the quantity of piperidine to that of amines can be increased.

Example 3

Equal quantities of ammonia and acetaldehyde vapor mixed with twice the quantity of hydrogen, are passed at a temperature of 350° centigrade over a catalyst consisting of zinc oxide precipitated on silica gel with which is incorporated some thorium oxide. The reaction mixture is then passed at 150° centigrade over nickel distributed on silica gel. From each 100 parts of liquid aldehyde about 35 parts of an oil are obtained which consists mainly of piperidine in addition to small quantities of amines and non-hydrogenated pyridine bases.

Example 4

A mixture of 10 parts of acetylene, 10 parts of ammonia and 50 parts of hydrogen is led first over finely divided cadmium precipitated on active silica gel at a temperature of 350° centrigrade and then over two layers of finely divided nickel distributed on the same carrier of which the first layer is kept at a temperature of 150° centigrade and the second is kept at 250° centigrade. The effluent vapors are fractionally condensed. From each 100 liters of acetylene about 100 cubic centimeters of a product are obtained which contains about 50 per cent of pyridine. The remainder consists chiefly of collidines and picolines in addition to small quantities of nitriles and amines.

What we claim is:—

1. In the production of valuable products from gaseous unsaturated hydrocarbons, by passing, while heating, an unsaturated aliphatic hydrocarbon together with a volatile compound, containing an active hydrogen atom, of a metalloid having an atomic weight from 14 to 16, over a catalyst comprising a compound of a metal of the second subgroup to the sixth group of the periodic system having a more metallic character than arsenic, the step which comprises heating the still reactive products in the presence of hydrogen and of a hydrogenation catalyst.

2. In the production of valuable products from gaseous unsaturated hydrocarbons by passing an unsaturated aliphatic hydrocarbon at a temperature between about 250° and 500° C. together with a volatile compound, containing an active hydrogen atom, of a metalloid having an atomic weight from 14 to 16 over a catalyst comprising a compound of a metal from the second subgroup to the sixth group of the periodic system having a more metallic character than arsenic the step which comprises heating the still reactive products in the presence of hydrogen and of a hydrogenation catalyst.

3. In the production of valuable products from gaseous unsaturated hydrocarbons by passing acetylene at a temperature between about 250° and 500° C. together with a volatile compound, containing an active hydrogen atom, of a metalloid having an atomic weight from 14 to 16 over a catalyst comprising a compound of a metal from the second subgroup to the sixth group of the periodic system having a more metallic character than arsenic, the step which comprises heating the still reactive products in the presence of hydrogen and of a hydrogenation catalyst.

4. In the production of valuable products from gaseous unsaturated hydrocarbons by passing acetylene together with a volatile compound of nitrogen containing an active hydrogen atom, at a temperature between about 250° and 500° C. over a catalyst comprising a compound of a metal from the second subgroup to the sixth group of the periodic system having a more metallic character than arsenic, the step which comprises heating the still reactive products in the presence of hydrogen and of a hydrogenation catalyst.

5. In the production of valuable products from gaseous unsaturated hydrocarbons by passing acetylene together with a volatile compound of nitrogen containing an active hydrogen atom at a temperature between about 250° and 500° C. over a catalyst comprising a compound of a metal from the second subgroup to the sixth group of the periodic system having a more metallic character than arsenic, the step which comprises adding hydrogen to the said gaseous mixture and a hydrogenation catalyst to the said catalyst.

6. In the production of valuable products from gaseous unsaturated hydrocarbons by passing acetylene together with a volatile compound of nitrogen containing an active hydrogen atom at a temperature between about 250° and 500° C. over a catalyst comprising a compound of a metal from the second subgroup to the sixth group of the periodic system having a more metallic character than arsenic, the step which comprises adding hydrogen to the said gaseous mixture and a metal, capable of catalytically accelerating hydrogenation, to the said catalyst.

7. In the production of valuable products from gaseous unsaturated hydrocarbons, by passing acetylene at a temperature between 250° and 500° C. together with ammonia over a catalyst comprising a compound of a metal of the second subgroup to the sixth group of the periodic system having a more metallic character than arsenic, the step which comprises heating the still reactive products in the presence of hydrogen and of a hydrogenation catalyst.

8. In the production of valuable products from gaseous unsaturated hydrocarbons, by passing acetylene at a temperature between about 250° and 500° C. together with ammonia over a catalyst comprising a compound of zinc, the step which comprises heating the still reactive products in the presence of hydrogen and of a hydrogenation catalyst.

9. In the production of valuable products from gaseous unsaturated hydrocarbons by passing acetylene at a temperature between about 250° and 500° C. together with ammonia over a catalyst comprising zinc oxide, the step which comprises heating the still reactive products in the presence of hydrogen and of a hydrogenation catalyst.

10. In the production of valuable products from gaseous unsaturated hydrocarbons, by passing acetylene together with ammonia at about 350° C. over a catalyst comprising zinc oxide and thorium oxide deposited on silica gel, the step which comprises heating the still reactive products in the presence of hydrogen with nickel deposited on silica gel at about 150° C.

In testimony whereof we have hereunto set our hands.

LEO SCHLECHT.
HANS ROETGER.